(12) United States Patent
Conforti

(10) Patent No.: US 6,886,979 B2
(45) Date of Patent: May 3, 2005

(54) TEMPERATURE MEASURE DEVICE

(76) Inventor: Carl J Conforti, 30 Riverview, Fall River, MA (US) 02724

( * ) Notice: Subject to any disclaimer, the term of this patent is extended or adjusted under 35 U.S.C. 154(b) by 0 days.

(21) Appl. No.: 10/612,512

(22) Filed: Jul. 2, 2003

(65) Prior Publication Data
US 2004/0233970 A1 Nov. 25, 2004

Related U.S. Application Data
(60) Provisional application No. 60/472,962, filed on May 23, 2003.

(51) Int. Cl.⁷ .............................. G01K 1/06; G01K 5/01; G01K 1/08; A61B 1/06
(52) U.S. Cl. ........................ 374/208; 374/158; 600/549; 600/248
(58) Field of Search ................................. 374/208, 158, 374/100; 600/474, 549, 185, 249, 245, 248, 484

(56) References Cited

U.S. PATENT DOCUMENTS

| | | | | |
|---|---|---|---|---|
| 2,118,523 A | * | 5/1938 | Pitman | 600/137 |
| 2,485,766 A | * | 10/1949 | Parcher | 600/200 |
| 2,683,450 A | * | 7/1954 | Schenk | 600/200 |
| 2,761,057 A | * | 8/1956 | Modell | 374/191 |
| 2,787,937 A | * | 4/1957 | Prisament | 359/800 |
| 3,268,716 A | * | 8/1966 | Mack | 362/157 |
| 3,650,153 A | * | 3/1972 | Schwab | 374/158 |
| 4,434,800 A | * | 3/1984 | Anson et al. | 600/473 |
| 4,987,579 A | * | 1/1991 | Yoshinaka et al. | 377/25 |
| 5,152,610 A | * | 10/1992 | Hallett | 374/156 |
| 5,588,748 A | * | 12/1996 | Nomura et al. | 374/158 |
| 6,027,499 A | * | 2/2000 | Johnston et al. | 606/22 |
| 6,112,123 A | * | 8/2000 | Kelleher et al. | 607/98 |
| 6,432,045 B2 | * | 8/2002 | Lemperle et al. | 600/135 |
| 6,435,689 B2 | * | 8/2002 | Pitts | 362/84 |
| 6,450,970 B1 | * | 9/2002 | Mahler et al. | 600/549 |
| 6,454,045 B1 | * | 9/2002 | Ryan | 181/131 |
| 6,569,090 B1 | * | 5/2003 | Mezzoli et al. | 600/200 |
| 6,591,049 B2 | * | 7/2003 | Williams et al. | 385/123 |
| 6,626,568 B2 | * | 9/2003 | Sato et al. | 374/121 |
| 6,634,789 B2 | * | 10/2003 | Babkes | 374/208 |
| 2001/0053171 A1 | * | 12/2001 | Sato et al. | 374/121 |
| 2003/0095406 A1 | * | 5/2003 | Lebens et al. | 362/231 |
| 2004/0062056 A1 | * | 4/2004 | Heine et al. | 362/555 |
| 2004/0122292 A1 | * | 6/2004 | Dey et al. | 600/190 |
| 2004/0143169 A1 | * | 7/2004 | Branch et al. | 600/245 |

* cited by examiner

Primary Examiner—Gail Verbitsky

(57) ABSTRACT

A temperature measure device having a light source to provide the user an effective and efficient means to take temperatures in a low-lighted area. A temperature measure device having a cartridge to store, dispense and discard the covers. The covers made of a thin narrow flexible material that is housed by a body and conveniently stored inside or in the proximity of the temperature-measuring device.

19 Claims, 5 Drawing Sheets

TEMPERATURE MEASURE DEVICE

CROSS REFERENCE TO RELATED ACTIONS

This application claims the benefits of U.S. Provisional Application Ser. No. 60/472,962 filed on May 23, 2003 entitled Temperature Measure device.

FIELD OF THE INVENTION

This invention relates to temperature measuring devices, probes and their use at night or in low-lighted areas.

BACKGROUND OF THE INVENTION

Thermometers are useful in the evaluation and treatment of sick or ill patients. A common practice in hospitals, physician's office or even at home, is to measure the body temperature of a patient by using a digital thermometer with a sensor or probe typically located at one end of the device.

An electronic thermometer can sense the patient's temperature in a short duration of time and more so infrared thermometers can be even more effective in measuring a temperature within one second.

Although thermometers have been around for many years, there has been other factors to consider in temperature measure and ease of use to provide the consumer a readily available means to take a fast and accurate temperature.

An electronic thermometer can easily take a temperature in well-illuminated areas, in most cases the patients are in a horizontal position, and more readily found in a room that may not be well lit depending on the time of day or the patient surroundings. Additionally, a probe should be sterile, free from germs or bacteria and easy to use. There are many different probes that are somewhat labor intensive to install on the temperature sensing probe or thermometer housing. There is also an issue with the ease of manufacturing the probes and the cost of the device that makes it expensive for the end user in a home or professional environment.

Protective probe covers have been available for electronic thermometers for many years although, a protective cover adds time to replace and take a measurement with today's covers offered on the market.

Therefore, the need for a probe cover dispensing mechanism and a light source from the temperature measure device would be a benefit as written in the invention detailed description.

SUMMARY OF THE INVENTION

The present invention relates in general to temperature measuring devices, and more particularly to an electronic or infrared temperature probe comprising a plastic like disposable probe cover or protective film, and a mechanism to dispense the cover itself. In general, one aspect of the invention provides a probe cover-dispensing device. The cover dispensing device comprises a body or housing to support or contain the covers, a material that is made to provide a series of covers that can be supplied by one or more means and dispensed and disposed of in a linear or rotary mechanism. The dispensing device has a mounting member to readily attach the covers, in the manufacturing assembly or by the consumer. The covers would typically be flat, narrow and thin for low cost of manufacture and compact storage. The cartridge or dispensing unit is lightweight, typically made of plastic or like material to provide a low cost disposable carrier. A small ratchet mechanism may provide the means to dispense the probe cover and a retaining cap that can pivot about an axis, or in a linear motion, over the end of the probe that would securely fix the probe cover material onto the probe and or sensor. The material dispensed would be readily available for use. Embodiments of the invention may also include one or more of the following features. A cartridge like dispensing unit that includes a long, thin narrow material that can be stretched onto the probe sensing device and preferably indexed to make the ease of assembly less time consuming. The index means would have a color variation or perforated edge to visually locate the dispensed unit. A guide can be adapted to the temperature measuring device housing that would include a cutting edge to tear away the disposable cover after use. Yet another feature of the invention would provide a light emitting diode or like that would provide a means to take temperature in low illuminated areas. The led or light can be positioned at the probe area or facing towards the probe to allow the user to guide the tip for faster temperature measure in the dark. The light source can also be part of the sensor wherein the probe or sensor is illuminated to assist in taking temperature measurements in low illuminated areas. In general another aspect of the invention is a tip providing an illuminated material that can light the surrounding area by means of luminescent ink, pigment or other material. The means to provide light can be derived by a material or combination of a small LED and battery with a simple contact that is in conjunction with the power source that is used to operate the measuring device.

These and other advantages of the invention, along with the invention itself, will be more fully understood after a review of the following figures, detailed description and claims.

Other embodiments are within the scope and spirit of the appended claims.

DETAILED DESCRIPTION OF THE INVENTION

Figure 1:
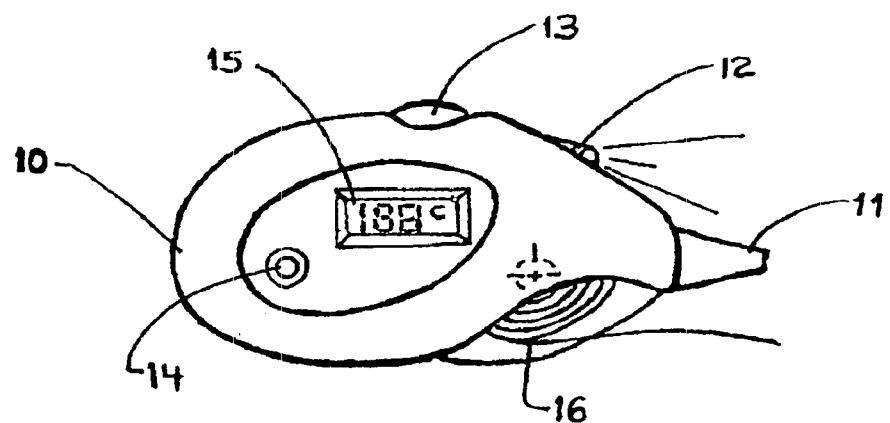
FIG. 1 shows a temperature-measuring device, including a mechanism, light, display and temperature probe.
Figure 2:
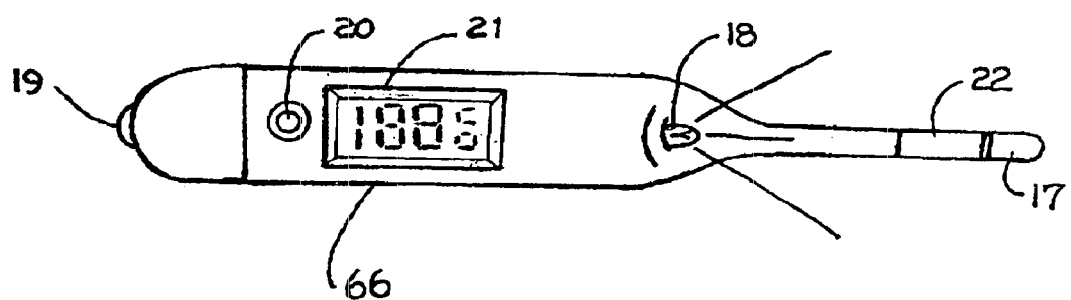
FIG. 2 shows another temperature measuring device, with an illuminating portion, light, display and temperature probe.
Figure 3A:
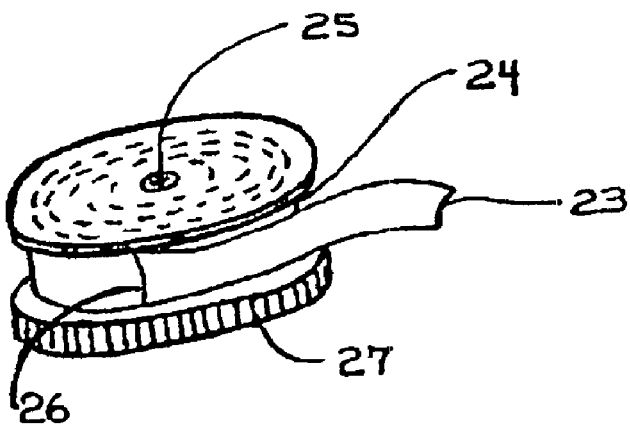
FIG. 3a shows a method of dispensing the film or cover with a cartridge.
Figure 3B:
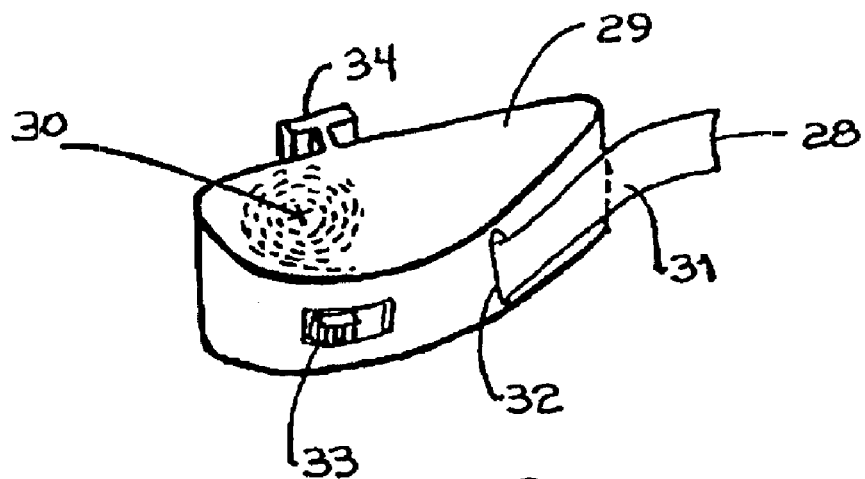
FIG. 3b shows another method of dispensing the film or cover with a self contained carrier and or cartridge.
Figure 3C:
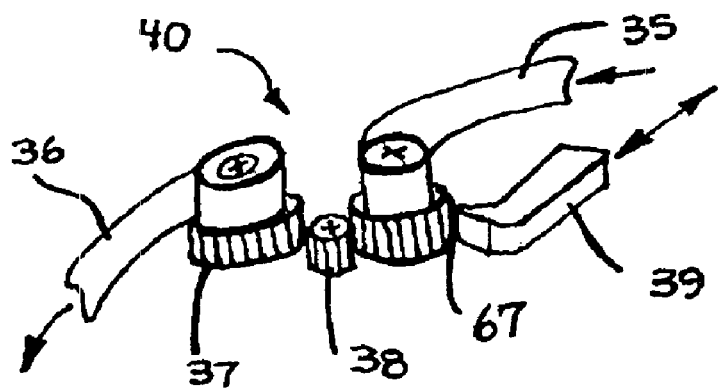
FIG. 3c shows a method of dispensing the film with a feed and take up mechanism.
Figure 3D:
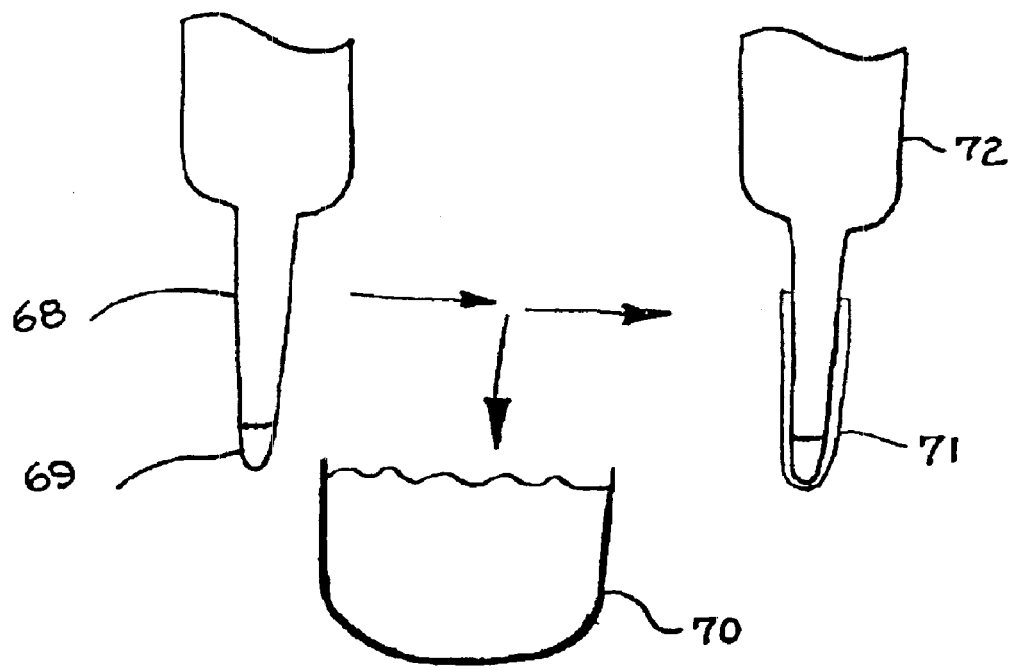
FIG. 3d shows a method of applying a liquid probe cover to a thermometer body at the sensor end.
Figure 4:
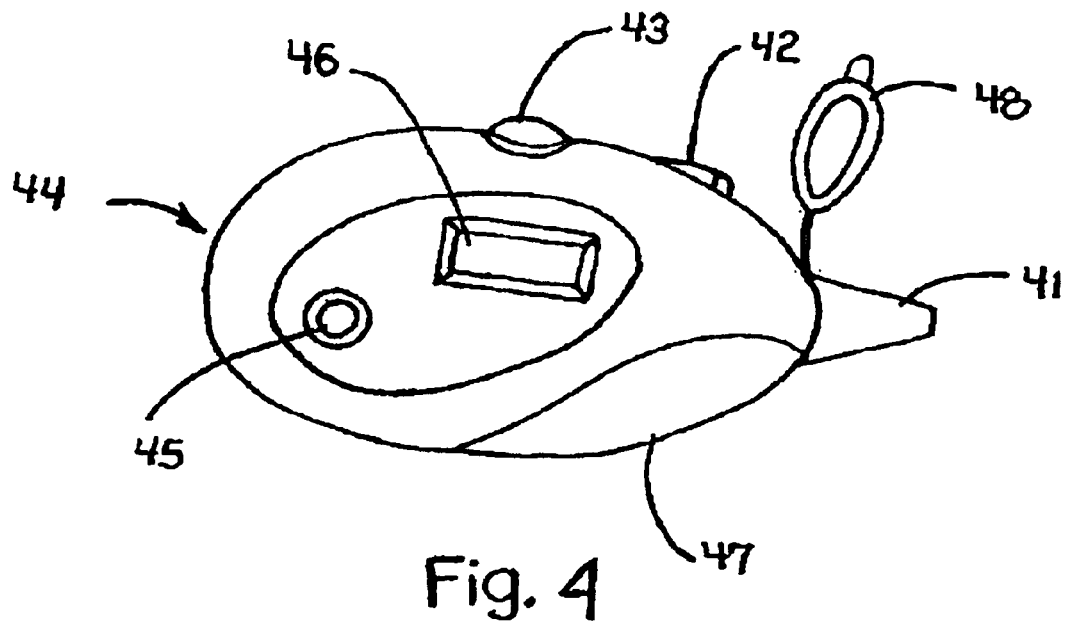
FIG. 4 shows a temperature-measuring device with a retainer for the flexible film or sensor cover.
Figure 5A:
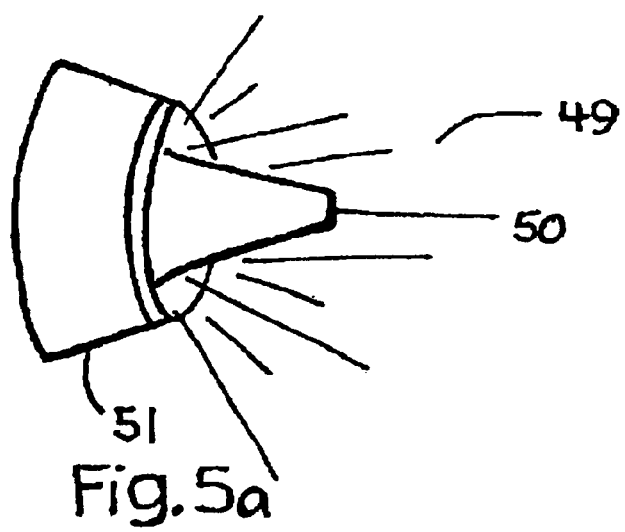
FIG. 5a shows a light source for temperature measure at the sensor tip.
Figure 5B:
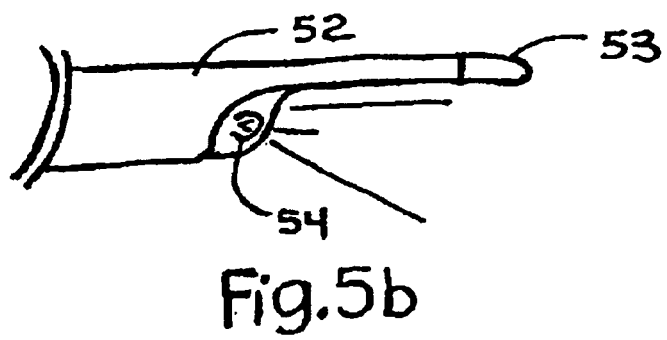
FIG. 5b shows a light source for temperature measure parallel or in the proximity of the sensor tip.
Figure 5C:
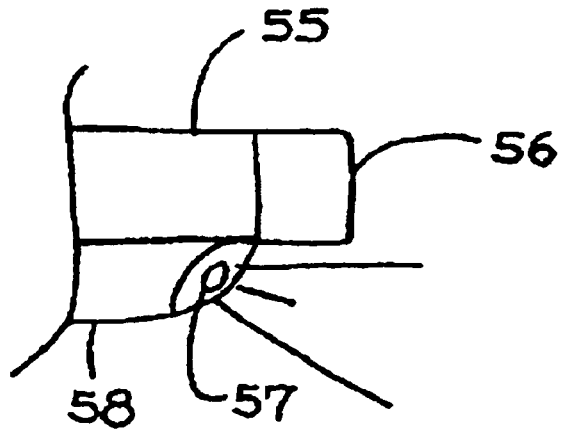
FIG. 5c a light source for temperature measure attached to the housing parallel or in proximity to the sensor tip.
Figure 5D:
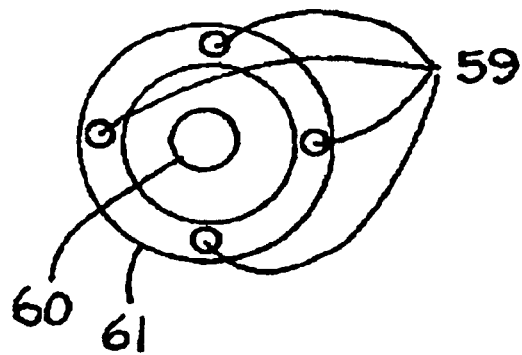
FIG. 5d a sensor with a series of light sources located in the housing and sensor.
Figure 5E:
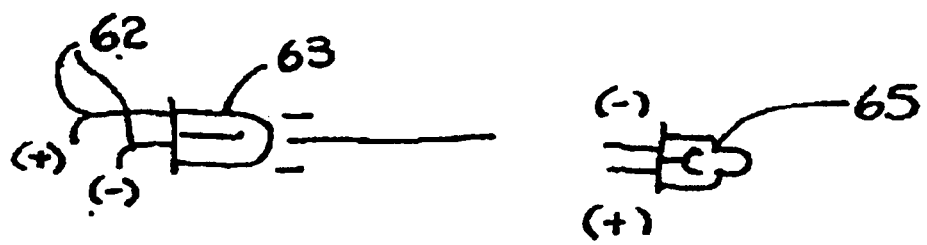
FIG. 5e a light source formation of a light emitting diode or lamp.

Referring to FIG. 1, a thermometer 10 includes a sensor 11, a light 12, an optional light power button 13 and a thermometer power button 14, a output display 15 to show the measurement or data from the device and an internal dispensable film cartridge 16. Depending on the style of the thermometer the components may have variations in detail but provide a means to take a temperature in an efficient time. The detail in FIG. 2 illustrates another style of a thermometer 66, that includes a sensor 17, a light 18, an optional light power button 19 and a thermometer power button 20, a display 21 to provide a visual output measurement from the device and an illuminated portion 22 of the thermometer that is made from a luminescent material or ink for ease of use in nighttime or low level lighted environments. The detail in FIG. 3a illustrates a carrier or cartridge 24, that can contain or hold the flexible film probe cover material 23 that may be wound around a central axis 25 on the carrier or cartridge and released from a point 27 on the cartridge in a direction parallel or-perpendicular to the body or sensor that can provide an adaptable flexible cover for the thermometer sensor tip. A gear 27 provides a method to index the film to a predetermined length or also provides a means to tension the film on the carrier or cartridge assembly. The detail in FIG. 3b illustrates a carrier 29 can provide a means to contain the flexible film material 28, that is wrapped about an axis 30 and fed through an opening point 32 on the cartridge or carrier. The flexible film is guided through a point 31 at a distance between the distal end and a opening point 32. A gear 33 provides a mechanism to feed the flexible film probe cover material. The detail in FIG. 3c illustrates a mechanism assembly 40 comprising a feed receiving end 35 of the flexible film materials that can be coupled to the feed discharge end 36 of the flexible film material, indexed and released from the feed member 67 activated by the feed mechanism 39 through a transfer member 38 in the feed system. The system provides a means to discharge or index the flexible film with a mechanical motion, and can also retrieve and store the used film in a disposable cartridge or carrier. The detail in FIG. 3d illustrates a thermometer housing 68, a sensor tip 69 and a liquid probe cover material 70, after the thermometer is submerged into the material to the desired depth, the liquid at turns into a thin layer probe cover 71, at the end of the thermometer housing 72, around the sensor area 69. The material may be plastic, paraffin or other liquid forms that can solidify in thin layer surface coatings at a predetermined temperature. The detail in FIG. 4 illustrates a thermometer 44, with a light 42 for low light or night time use, an optional light switch 43, a device power switch 45, a display readout 46 indicating temperature and alike, a sensor 41, with a retainer 48 that can pivot or slide to retain the film or secure the flexible film in position, the film released from and housed in removable door 47 that is secured to the housing 44. The detail in FIG. 5a illustrates a sensor 50, positioned in a thermometer 51 and housing providing light to be discharged through an opening 49 at the end of the housing in a direction somewhat parallel to the sensor. The detail in FIG. 5b illustrates a thermometer housing 52, a sensor tip 53 in close proximity to the light source lamp or LED 54, positioned somewhat parallel to the sensor tip direction or in the general area. The detail in FIG. 5c illustrates a thermometer housing 53, a sensor 56, a light source assembly 58 attached to the housing, with LED or lamp 57, for low-level light conditions. The FIG. 5d illustrates a thermometer housing front view 61, a sensor 60, a light source 59, where the light source may be provided in multiple locations. The light source may be indicative of a bulb or LED. The illustration in FIG. 5e illustrates a bulb or LED light source 63 and the power leads 62 that may be supplied from an internal battery or external power connection. The light source may have a focused light wave 64 to minimize the effect of light in use with the patient or subject of which the temperature is taken. A light source 65 may be that of a bulb that is repairable or have the option to replace when the life of the bulb is exhausted.

The terms and expressions, which have been employed in the foregoing specification, are used therein as terms of description and not of limitation, and there is no intention, in the use of such terms and expressions, as excluding equivalents of the features shown and described or portions thereof, it being recognized that the scope of the invention is defined and limited only by the claims which follow.

What is claimed is:

1. A temperature measuring device comprising:
    a housing including a main portion configured to be grasped by a person;
    a temperature probe attached to the housing and configured to sense temperature, the probe extending from the main portion of the housing in a configuration for insertion into an orifice or within close proximity of a surface area on a patient's body where temperature is to be measured; and
    a light source coupled to the housing and configured to provide visible light in a vicinity of the probe;
    wherein the light source is configured to provide visible light external to the housing, externally illuminating a region in front of and behind the tip of the probe outside the housing to provide a means for the person taking the temperature measure to position the probe to a desired area on the patient's body.

2. The device of claim 1 wherein the temperature probe is independently selectively operable to sense temperature and wherein the light source is selectively operable to provide the light independent of actuation of the temperature probe sensor.

3. The device of claim 1 wherein the light source is a light-emitting diode.

4. The device of claim 1 further comprising a long narrow strip, of thin flexible material, providing a means of displacement for indexing the long narrow strip, of thin flexible material in a linear displacement for multiple uses, coupled to the housing and configured to cover at least a portion of the temperature probe configured to be utilized in measuring temperature on a patient's body.

5. The device of claim 4 wherein the thin, flexible material is a roll of the material that is rotatably mounted to the housing, having an inner support member removably fixed inside the housing, and wherein the housing provides an opening to allow the dispensing of the material to the temperature probe.

6. The device of claim 5 wherein the roll is periodically perforated across a width of the thin, flexible material at a distance equal to at least a linear distance from a start point from the opening on the main portion of the housing over and covering the probe.

7. The device of claim 5 wherein the narrow, thin, flexible material is secured in a position to the probe or housing by a rotating semi rigid member that is attached to the housing and provides a means to secure the thin flexible material in a fixed position while measuring temperatures.

8. The device of claim 5 wherein the roll includes adhesive on at least portions of the material for attaching the material to an outer surface of the housing.

9. A temperature measuring device comprising: a housing including a main portion configured to be grasped by a person; a temperature probe retained by the housing and configured to sense temperature, the probe extending from the main portion of the housing in a configuration for insertion onto a surface area of a patient's body where a desired body temperature is to be measured; and a strip of thin, flexible material coupled to the housing and configured to cover at least a portion of the temperature probe configured to be in contact with the patient, and where the dispensing mechanism is coupled to the housing and said material is configured to dispense and cover at least a portion of the temperature probe for a plurality of times wherein the roll is selectively marked with an ink on at least portion of the material to identify a location of a start, end or index measure of the material.

10. The device of claim 9 wherein the temperature probe comprises an illuminating ink or pigment.

11. The device of claim 9 wherein the housing comprises a light source coupled to the housing and configured to provide visible light in a vicinity externally in front of and behind a tip of the probe.

12. A temperature measuring device comprising:
   a housing including a main portion configured to be grasped by a person;
   a temperature probe retained by the housing and configured to sense temperature, the probe extending from the main portion of the housing in a configuration for insertion onto a surface area of a patient's body where a desired body temperature is to be measured; and
   a strip of thin, flexible material coupled to the housing and configured to cover at least a portion of the temperature probe configured to be in contact with the patient; and where the dispersing mechanism is coupled to the housing and the material is configured to dispense and cover at least a portion of the temperature probe for a plurality of times wherein the thin, flexible material comprises a roll of the material and the dispensing mechanism is rotatably mounted to the housing.

13. The flexible material of claim 12 wherein the material is periodically perforated across the width of the material.

14. The device of claim 12 wherein the thin flexible material is essentially configured with adhesive on at least portions of the material for attaching the material to an outer surface of the housing.

15. The device of claim 12 further comprising a light source coupled to the housing and configured to provide visible light in a vicinity externally in front of and behind a tip of the probe;
   wherein the light source can illuminate a region in front of and behind a tip of the probe to assist the person with inserting the probe onto the patient.

16. The device of claim 15 wherein the light source is a light-emitting diode.

17. A temperature measuring device comprising: a housing including a main portion configured to be grasped by a person; a temperature probe retained by the housing and configured to sense temperature, the probe extending from the main portion of the housing in a configuration for insertion onto a surface area of a patient's body where a desired body temperature is to be measured; and a strip of thin, flexible material coupled to the housing and configured to cover at least a portion of the temperature probe configured to be in contact with the patient, and where the dispensing mechanism is coupled to the housing and said material is configured to dispense and cover at least a portion of the temperature probe for a plurality of times wherein said material comprises a roll of material disposed inside of the housing and wherein the housing provides means to allow dispensing of the material to the temperature probe.

18. The device of claim 17 further comprising a light source coupled to the housing and configured to provide visible light external to the housing in front of and behind a tip of the probe:
   wherein the light source can illuminated a region in front of and behind a tip of the probe to assist the person with inserting the probe only the patient.

19. A temperature measuring device comprising:
   a housing including a main portion configured to be grasped by a person;
      a temperature probe attached to the housing and configured to sense temperature, the probe extending from the housing in a configuration for insertion into onto a surface area of a patient's body where the desired body temperature is to be measured; and
      a light source attached to the housing and configured to provide visible light in a vicinity of the probe;
      wherein the light source is configured to be activated by an independent switch;
      wherein the light source is configured to provide visible light external to the housing, externally illuminating a region in front of and behind the tip of the probe outside the housing to provide a means for a person taking temperature measure to position the probe to a desired location on the patients body.

* * * * *